United States Patent
Eyal et al.

(10) Patent No.: US 10,366,408 B2
(45) Date of Patent: Jul. 30, 2019

(54) METHOD FOR ANALYZING INFLUENCER MARKETING EFFECTIVENESS

(71) Applicant: MOGIMO, Inc., New York, NY (US)

(72) Inventors: Gil Eyal, Hoboken, NJ (US); Guy Tamir, Kfar Saba (IL)

(73) Assignee: MOGIMO, INC., New York, NY (US)

( * ) Notice: Subject to any disclaimer, the term of this patent is extended or adjusted under 35 U.S.C. 154(b) by 292 days.

(21) Appl. No.: 15/392,392

(22) Filed: Dec. 28, 2016

(65) Prior Publication Data

US 2018/0181985 A1 Jun. 28, 2018

(51) Int. Cl.
| | |
|---|---|
| G06Q 30/00 | (2012.01) |
| G06Q 30/02 | (2012.01) |
| G06Q 50/00 | (2012.01) |
| G06F 16/951 | (2019.01) |

(52) U.S. Cl.
CPC ....... *G06Q 30/0246* (2013.01); *G06F 16/951* (2019.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 8,738,437 B2* | 5/2014 | Gailey | ............. | G06F 17/30867 705/14.41 |
| 2008/0270578 A1* | 10/2008 | Zhang | ................ | H04L 63/0807 709/219 |
| 2009/0313309 A1* | 12/2009 | Becker | .................... | G06F 16/13 |
| 2011/0106840 A1* | 5/2011 | Barrett | ................... | G06Q 30/02 707/769 |
| 2014/0019240 A1* | 1/2014 | Zhou | .................. | G06Q 30/0203 705/14.53 |
| 2014/0025483 A1* | 1/2014 | Villars | ............... | G06Q 30/0242 705/14.45 |
| 2014/0052539 A1* | 2/2014 | Lauback | ........... | G06Q 30/0255 705/14.66 |
| 2014/0337090 A1* | 11/2014 | Tavares | ............. | G06Q 30/0201 705/7.29 |
| 2015/0220836 A1* | 8/2015 | Wilson | ............... | G06Q 30/0631 706/46 |

(Continued)

*Primary Examiner* — Matthew T Sittner
(74) *Attorney, Agent, or Firm* — Buchanan, Ingersoll & Rooney PC

(57) ABSTRACT

A method for identification of influencer social network marketing effectiveness includes: storing social network profiles, each including a profile identifier and social network connections; receiving an effectiveness request including transaction data for electronic commerce transactions, each including identifying information and a transaction time; receiving data associated with a promoted social network post including a posting time and a specific profile identifier; identifying, for each transaction, a corresponding social network profile based on a correspondence between the profile identifier and the transaction's identifying information; identifying a specific social network profile that includes the specific profile identifier; determining, for each transaction, if the transaction was influenced by the promoted social network post based on the social network connections in the corresponding profile and the specific social network profile and the transaction time and posting time; and transmitting a report based on a result of the determination for each transaction.

18 Claims, 5 Drawing Sheets

(56) References Cited

U.S. PATENT DOCUMENTS

| | | | | |
|---|---|---|---|---|
| 2015/0294343 A1* | 10/2015 | Kodali | ............... | G06Q 30/0226 |
| | | | | 705/14.27 |
| 2016/0180386 A1* | 6/2016 | Konig | ................ | G06Q 30/0255 |
| | | | | 705/14.55 |
| 2016/0292739 A1* | 10/2016 | Crook | ................ | G06Q 30/0261 |
| 2018/0181985 A1* | 6/2018 | Eyal | ................... | G06Q 30/0246 |

* cited by examiner

METHOD FOR ANALYZING INFLUENCER MARKETING EFFECTIVENESS

FIELD

The present disclosure relates to the analysis of the marketing effectiveness of a post made by an influential user in a social network based on captured transaction data and social network connections associated with a promoted marketing attempt via a social network.

BACKGROUND

Social networks have provided countless individuals with the ability to reconnect with lost friends and acquaintances, stay in touch with distant friends and family, and be exposed to content they may have missed otherwise. While social networks provide a vast number of benefits to their users, they are also often of benefit to brands, agencies, advertisers, businesses and other entities interested in reaching out to new customers due to the vast user base and reach of social networks.

As a result, social networks often provide the opportunity for entities to engage their influential or highly followed users to promote a post on the social network, also sometimes referred to as a sponsored post or other indication of the post being made as part of a service. Traditionally, promoted posts are offered by an influential social media user via a social network for a cost, with the benefit being that the post is displayed to a vast number of the users of the social network, guaranteeing a wide reach for the entity.

However, while such techniques may be useful in reaching potential customers, there is currently no suitable measure for determining the actual effectiveness of such a technique. For instance, a merchant that promotes an advertisement for the merchant may experience an uptick in their business following the posting of the promoted post, but may be unable to discern if the uptick was the result of the promoted post or of other circumstances (e.g., a different advertisement, word-of-mouth, random chance, etc.). There is currently no tool capable of attributing a merchant or advertiser's list of converted users to a promoted social media post.

Thus, there is a need for a technical solution to accurately determine the marketing effectiveness of a promoted post on a social network via measurable results that can be directly attributed to the promoted post.

SUMMARY

The present disclosure provides a description of systems and methods for the identification of influencer social network marketing effectiveness. The methods and systems discussed herein utilize transaction data for electronic commerce transactions that were conducted related to a promoted post, where the transactions are traced back to social network users, and from there it is determined if the social network user was likely to have been exposed to or otherwise may have been influenced by the promoted post. Such methods can thus identify conversions of a promoted post to provide an accurate measurement of the effectiveness of the post based on results that can be directly attributed thereto without relying on a direct click to the promoted post.

A method for identification of influencer social network marketing effectiveness includes: storing, in a social network database of a processing server, a plurality of social network profiles, wherein each social network profile is a structured data set configured to store data related to a user profile in a social network including at least a profile identifier, a network identifier, one or more social network connections, and one or more data values; receiving, by a receiving device of the processing server, an effectiveness request, wherein the effectiveness request includes a set of transaction data for at least one electronic commerce transaction, each set of transaction data including at least identifying information and a transaction time; receiving, by the receiving device of the processing server, data associated with a promoted social network post, wherein the data includes at least a posting time and a specific profile identifier; executing, by a querying module of the processing server, a first query on the social network database to identify, for each of the at least one electronic commerce transaction, a corresponding social network profile based on at least a correspondence between the included profile identifier and the identifying information included in the set of transaction data for the respective electronic commerce transaction; executing, by the querying module of the processing server, a second query on the social network database to identify a specific social network profile where the included profile identifier corresponds to the specific profile identifier; determining, by a determination module of the processing server, for each of the at least one electronic commerce transaction, if the respective electronic commerce transaction was influenced by the promoted social network post based on at least a correspondence between the one or more social network connections included in the corresponding social network profile and the specific social network profile and a correspondence between the transaction time included in the set of transaction data for the respective electronic commerce transaction and the posting time; and electronically transmitting, by a transmitting device of the processing server, a report in response to the received effectiveness request, wherein the report is based on at least a result of the determination for each of the at least one electronic commerce transactions.

A system for identification of influencer social network marketing effectiveness includes: a social network database of a processing server configured to store a plurality of social network profiles, wherein each social network profile is a structured data set configured to store data related to a user profile in a social network including at least a profile identifier, a network identifier, one or more social network connections, and one or more data values; a receiving device of the processing server configured to receive an effectiveness request, wherein the effectiveness request includes a set of transaction data for at least one electronic commerce transaction, each set of transaction data including at least identifying information and a transaction time, and data associated with a promoted social network post, wherein the data includes at least a posting time and a specific profile identifier; a querying module of the processing server configured to execute a first query on the social network database to identify, for each of the at least one electronic commerce transaction, a corresponding social network profile based on at least a correspondence between the included profile identifier and the identifying information included in the set of transaction data for the respective electronic commerce transaction, and a second query on the social network database to identify a specific social network profile where the included profile identifier corresponds to the specific profile identifier; a determination module of the processing server configured to determine for each of the at least one electronic commerce transaction, if the respective electronic commerce transaction was influenced by the promoted social network post based on at least a correspondence between the one or more social network connections included in the corresponding social network profile and the specific social network profile and a correspondence between the transaction time included in the set of transaction data for the respective electronic commerce transaction and the posting time; and a transmitting device of the processing server configured to electronically transmit a report in response to the received effectiveness request, wherein the report is based on at least a result of the determination for each of the at least one electronic commerce transactions.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Identifying Social Network Marketing Effectiveness

Figure 1:
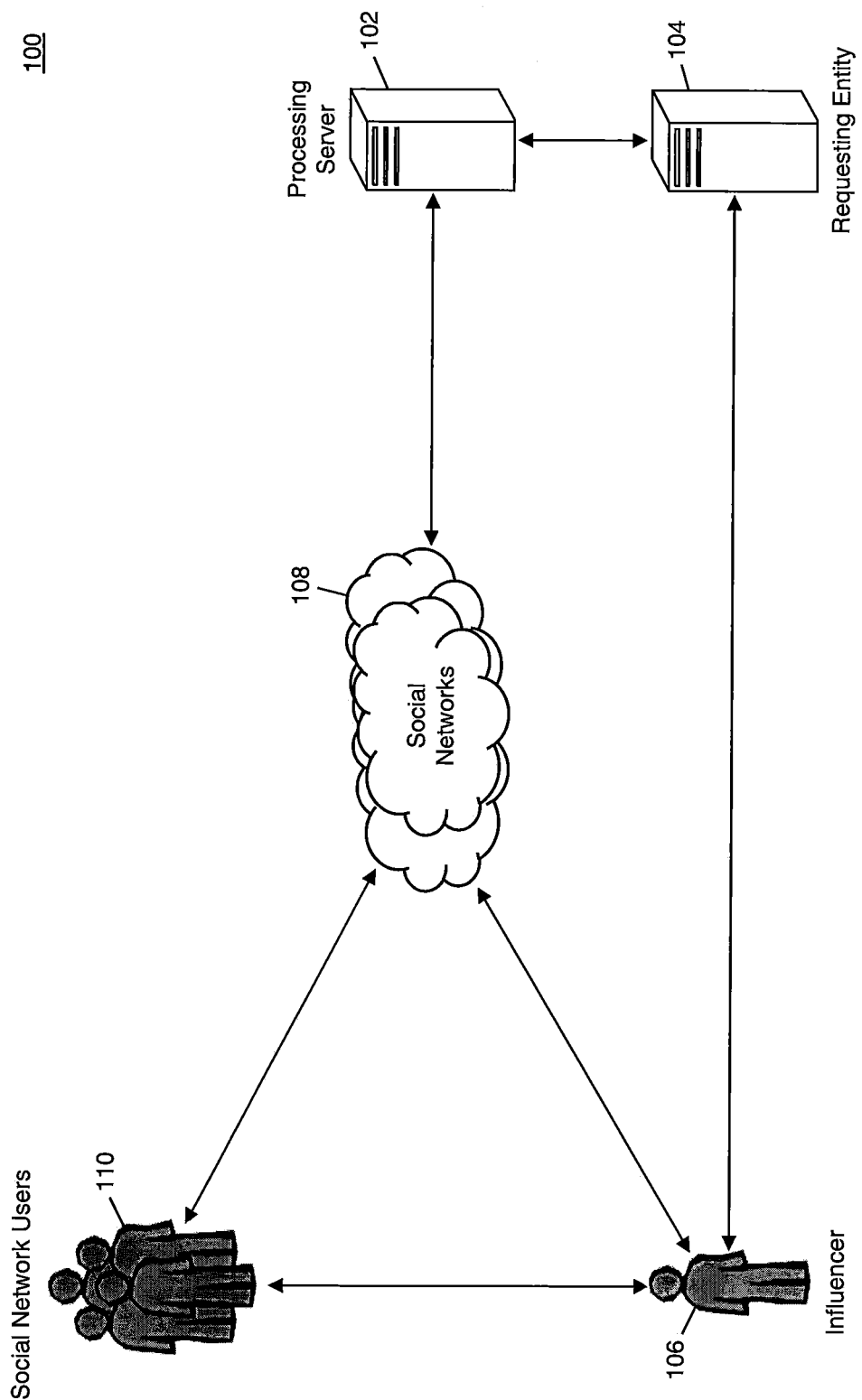
FIG. 1 is a block diagram illustrating a high level system architecture for the identification of influencer social network marketing effectiveness in accordance with exemplary embodiments.

FIG. 1 illustrates a system 100 for the identification of the effectiveness of marketing via a social network promoted post based on transaction data for electronic commerce transactions that may be attributed to social network users.

The system 100 may include a processing server 102. The processing server 102, discussed in more detail below, may be configured to identify the effectiveness of marketing done via a social network based on electronic commerce transactions. The processing server 102 may receive a request from a requesting entity 104, which may communicate with the processing server 102 using any suitable communication network and method, such as a local area network, wireless area network, the Internet, cellular communication, etc. The requesting entity 104 may be an advertiser, merchant, retailer, manufacturer, or other type of entity that may be interested in having the effectiveness of marketing content distributed via a social network.

The request may include at least a set of transaction data for one or more electronic commerce transactions. The set of transaction data may include any data related to the electronic commerce transaction, such as a transaction time, transaction date, transaction amount, customer name, merchant name, geographic location, offer data, reward data, loyalty data, etc. In some instances, the electronic commerce transactions may each be related to a purchase made that is associated with the promoted post for which the marketing effectiveness is requested. For instance, if the promoted post is an advertisement for a specific product, the electronic commerce transactions may be for the purchase of that specific product. In another example, if the prompted post is advertising a merchant, the electronic commerce transactions may include all transactions at that merchant after the promoted post was distributed.

The processing server 102 may also receive data indicating a promoted social network post. In some instances, the data may be included in the effectiveness request submitted by the requesting entity 104. In other instances, the data may be received via a separate communication from the requesting entity 104, or from a separate entity. The data may indicate at least a time at which the post was posted or promoted, as well as information indicating the reach of the promoted post. In one embodiment, such information may include a profile identifier associated with a social network account used to make the promoted post. A profile identifier may be a unique value associated with a social network account suitable for use in the identification thereof, such as an identification number, username, email address, telephone number, etc. In other embodiments, the information may include profile identifiers or other data for users that may have been exposed to the promoted post.

In the system 100, an influencer 106 may make a post to one or more social networks 108 that may be used for advertising, for which the requesting entity 104 requests effectiveness. In some instances, the post made by the influencer 106 may be promoted by the social network 108 directly (e.g., via a method used to increase visibility of the promoted post), or may be promoted by virtue of the posting by the influencer 106, such as where the influencer 106 makes a standard post that is an advertisement that can be viewed by all of the influencer's connections on the associated social network 108.

Each social network 108 may include a plurality of social network users 110. Each social network user 110 may have an account with a social network 108 and, in some instances, may also have an account or accounts with additional social networks 108. The processing server 102 may be configured to receive and store data associated with social network profiles in a social network database, discussed in more detail below. The social network database may be comprised of a plurality of different social network profiles, each profile being related to a profile of a social network user 110 of a social network 108, where the profile includes at least a profile identifier, network identifier, one or more social network connections, and one or more data values.

The profile identifier may be a unique value suitable for use in identifying the user profile in the associated social network 108, such as an identification number, username, email address, telephone number, etc. The network identifier may be a unique value that corresponds to the related social network 108 for identification thereof, such as a name, uniform resource locator, identification number, etc. The one or more social network connections may include profile identifiers or other indicative values of one or more connections on the social network, where the connection may depend on the type of social network. For instance, connections may be friends, followers, subscribers, users followed, subscriptions, or a combination thereof. In some cases, the social network connections included in a social network profile may include multiple categories, such as a category for followers of the related social network users 110, as well as a category for the other social network users 110 followed by the related social network users 110. The one or more data values may include additional data associated with the related social network user 110 and/or user profile in the associated social network 108, such as profile and network identifiers for other social network accounts for the same social network user 110, or demographic characteristics, such as name, geographic location, gender, age, occupation, education, familial status, marital status, residential status, etc.

The processing server 102 may receive the social network data using any suitable method. For instance, the processing server 102 may receive the social network data from the social networks 108 directly, such as via application programming interfaces associated therewith. In another example, the processing server 102 may use specialized programming tools to navigate web pages or application programs of a social network 108 to identify and obtain social network data associated therewith, such as a specifically programmed web crawler.

Upon the receipt of an effectiveness request from the requesting entity 104, the processing server 102 may attempt to identify social network profiles related to each of the electronic commerce transactions. The identification of social network profiles may be based on the correspondence between the transaction data for the electronic commerce transaction and the one or more data values included in the social network profile. For instance, the transaction data may include a name and geographic location, which may be matched to a social network profile based on its name and geographic location.

After social network profiles have been matched to electronic commerce transactions, the processing server 102 may determine if each of the purchases was potentially influenced by the promoted social network post. The determination may be based on at least a connection between the social network user 110 related to the social network profile and the influencer 106, which may be determined based on the connection data included in the respective social network profiles, as well as the time at which the promoted post was posted and the purchase was made. For instance, if the purchase was made before or within minutes of the posting of the promoted post (e.g., particularly if the electronic commerce transaction was conducted at a physical storefront, as may be indicated via the transaction data), the processing server 102 may determine that the social network user 110 was not influenced by the promoted post. Likewise, if the social network user 110 is not a follower of or otherwise connected to the influencer 106, the purchase may likely not be influenced by the promoted post as it was thus likely not viewed by the social network user 110.

Once the processing server 102 has identified each of the social network users 110 that were likely influenced by the promoted post, the processing server 102 may report to the requesting entity 104. In some instances, the report may include a representation of the effectiveness, which may be, for instance, a percentage of purchases influenced by the promoted post or a score associated therewith. In some embodiments, the report may also include data associated with the influenced social network users 110, such as their profile identifiers or an analysis of the demographic characteristics associated therewith. In some cases, the processing server 102 may be configured to identify one or more demographic characteristics, such as based on a name of the social network user 110, such as using techniques described in U.S. Provisional Patent Application No. 62/115,227, entitled "Method and System for Analysis of User Data Based on Social Network Connections," which is herein incorporated by reference in its entirety. As such, the report may include, for instance, demographic characteristics of the influenced social network users 110 for use by the requesting entity 104 in future marketing efforts.

In some embodiments, the processing server 102 may be configured to perform the functions discussed herein in relation to multiple social networks 108. For instance, the social network profiles may include profiles for social network users 110 on a plurality of different social networks 108. The processing server 102 may identify social network profiles related to electronic commerce transactions across each of the social networks 108 regardless of the social network 108 used for the promoted post, where the processing server 102 may identify, for a matched social network profile, a related social network profile for the social network 108 on which the promoted post was made, to determine if the related social network users 110 was influenced. In some cases, promoted posts may be posted on multiple social networks 108, where the processing server 102 may perform the functions discussed herein in relation to each social network 108. In such cases, the report may indicate overall effectiveness and/or effectiveness related to each of the social networks 108.

The methods and systems discussed herein enable the processing server 102 to more accurately determine the effectiveness of a promoted post on a social network 108 than in traditional systems. By using transaction data of actual transactions related to a promoted post, the processing server 102 can determine if a purchase was potentially influenced by the promoted post, as well as determine the likelihood based on social network connections, timing, and other factors. In addition, the ability for the processing server 102 to identify demographic characteristics of social network users 110 as part of the reporting can further increase the benefits provided to requesting entities 104. As a result, the methods discussed herein provide more accurate and more useful measures of advertising effectiveness.

Processing Server

Figure 2:
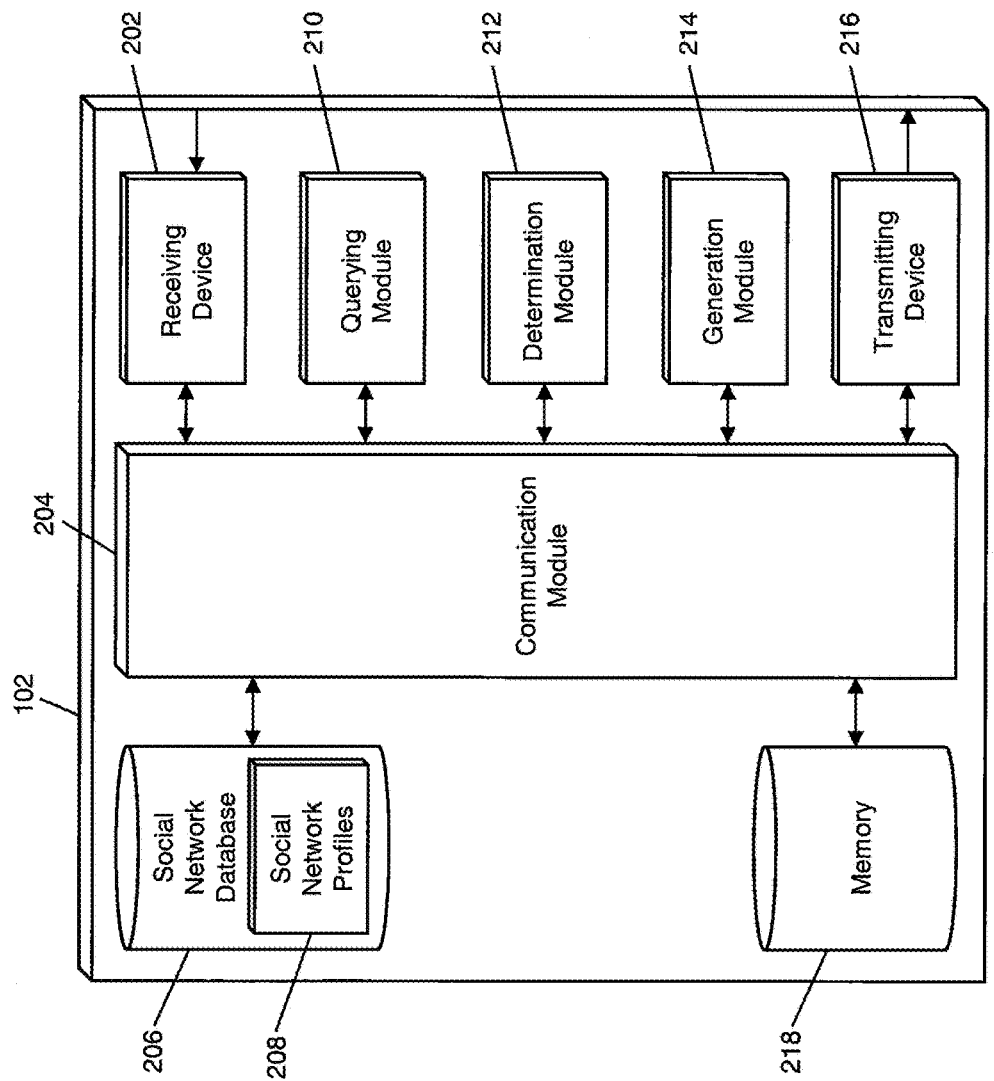
FIG. 2 is a block diagram illustrating the processing server of FIG. 1 for identifying the marketing effectiveness of an influencer in a social network in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102.

The processing server 102 may include a receiving device 202. The receiving device 202 may be configured to receive data over one or more networks via one or more network protocols. In some embodiments, the receiving device 202 may be configured to receive data from requesting entities 104, social networks 108, and other entities via one or more communication networks, such as local area networks, cellular communication networks, the Internet, etc. In some embodiments, the receiving device 202 may be comprised of multiple devices, such as different receiving devices for receiving data over different networks, such as a first receiving device for receiving data via cellular communication networks and a second receiving device for receiving data over the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by requesting entities 104, which may be superimposed or otherwise encoded with an effectiveness request. The effectiveness request may request a measurement of the effectiveness of a social network marketing effort, and include at least a set of transaction data for one or more electronic commerce transactions. The receiving device 202 may also be configured to receive data signals electronically transmitted by social networks 108, which may be superimposed or otherwise encoded with social network data, which may be used in the creation of social network profiles, the social network data being associated with a plurality of user profiles with the respective social network 108. The receiving device 202 may also be configured to receive data signals superimposed or otherwise encoded with data associated with a promoted post, such as may be transmitted by the requesting entity 104 or an associated social network 108, the data including at least a posting time and a profile identifier associated with the poster or with social network users 110 to whom the promoted post was exposed.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 210, determination module 212, generation module 214, etc. As used herein, the term "module" may be software or hardware particularly programmed to receive an input, perform one or more processes using the input, and provide an output. The input, output, and processes performed by various modules will be apparent to one skilled in the art based upon the present disclosure.

The processing server 102 may include a social network database 206. The social network database 206 may be configured to store a plurality of social network profiles 208 using a suitable data storage format and schema. The social network database 206 may be a relational database that utilizes structured query language for the storage, identification, modifying, updating, accessing, etc. of structured data sets stored therein. Each social network profile 208 may be a structured data set configured to store data related to a user profile in a social network 108. The social network profile 208 may include at least a profile identifier, a network identifier associated with the related social network 108, one or more social network connections, and one or more data values.

The processing server 102 may include a querying module 210. The querying module 210 may be configured to execute queries on databases to identify information. The querying module 210 may receive one or more data values or query strings, and may execute a query string based thereon on an indicated database, such as the social network database 210, to identify information stored therein. The querying module 210 may then output the identified information to an appropriate engine or module of the processing server 102 as necessary. The querying module 210 may, for example, execute a query on the social network database 206 to identify a social network profile 208 related to a set of transaction based on the respective one or more data values and transaction data. The querying module 210 may also execute queries on the social network database 206 to identify related social network profiles 208, and to identify social network profiles 208 related to a promoted post, such as based on the profile identifier.

The processing server 102 may also a determination module 212. The determination module 212 may be configured to make determinations about data presented thereto, in accordance with received instructions. The determination module 212 may receive instructions, may perform determinations based thereon, and may output results for the determinations to another module or engine of the processing server 102. For example, the determination module 212 may be configured to determine geographic metrics for a group of influenced social network users 110, such as based on the data values included in their associated social network profiles 208. In another example, the determination module 212 may be configured to determine relationships between social network profiles 208, such as based on the data values included therein. The determination module 212 may also be configured to determine if an electronic commerce transaction was influenced by a promoted post based on social network connections, time, and other data values.

The processing server 102 may also include a generation module 214. The generation module 214 may be configured to generate data for use by the processing server 102 in performing the functions discussed herein. The generation module 214 may receive an instruction as input, may generate data pursuant to that instruction, and may output the generated data to another module or engine of the processing server 102. In some instances, the generation module 214 may be supplied data for use in the generation of data as instructed. For instance, the generation module 214 may be configured to generate a report of influencer social network marketing effectiveness, which may be based on determinations made by the determination module 212 and communicated therefrom.

The processing server 102 may also include a transmitting device 216. The transmitting device 216 may be configured to transmit data over one or more networks via one or more network protocols. In some embodiments, the transmitting device 216 may be configured to transmit data to requesting entities 104, social networks 108, and other entities via one or more networks, such as local area networks, cellular communication networks, the Internet, payment rails, etc. In some embodiments, the transmitting device 216 may be comprised of multiple devices, such as different transmitting devices for transmitting data over different networks, such as a first transmitting device for transmitting data over a local area network and a second transmitting device for transmitting data over the Internet. The transmitting device 216 may electronically transmit data signals that have data superimposed that may be parsed by a receiving computing device. In some instances, the transmitting device 216 may include one or more modules for superimposing, encoding, or otherwise formatting data into data signals suitable for transmission.

The transmitting device 216 may be configured to electronically transmit data signals requesting entities 104, which may be superimposed or otherwise encoded with reports on influencer social network marketing effectiveness, such as may be generated by the generation module 214. The transmitting device 216 may also be configured to electronically transmit data signals to social networks 108, such as may be superimposed or otherwise encoded with data requests, such as requesting social network data, such as user profile data.

The processing server 102 may also include a memory 218. The memory 218 may be configured to store data for use by the processing server 102 in performing the functions discussed herein. The memory 218 may be configured to store data using suitable data formatting methods and schema and may be any suitable type of memory, such as read-only memory, random access memory, etc. The memory 218 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 218 may be comprised of or may otherwise include a relational database that utilizes structured query language for the storage, identification, modifying, updating, accessing, etc. of structured data sets stored therein.

Determining Influencer Social Network Marketing Effectiveness

Figure 3:
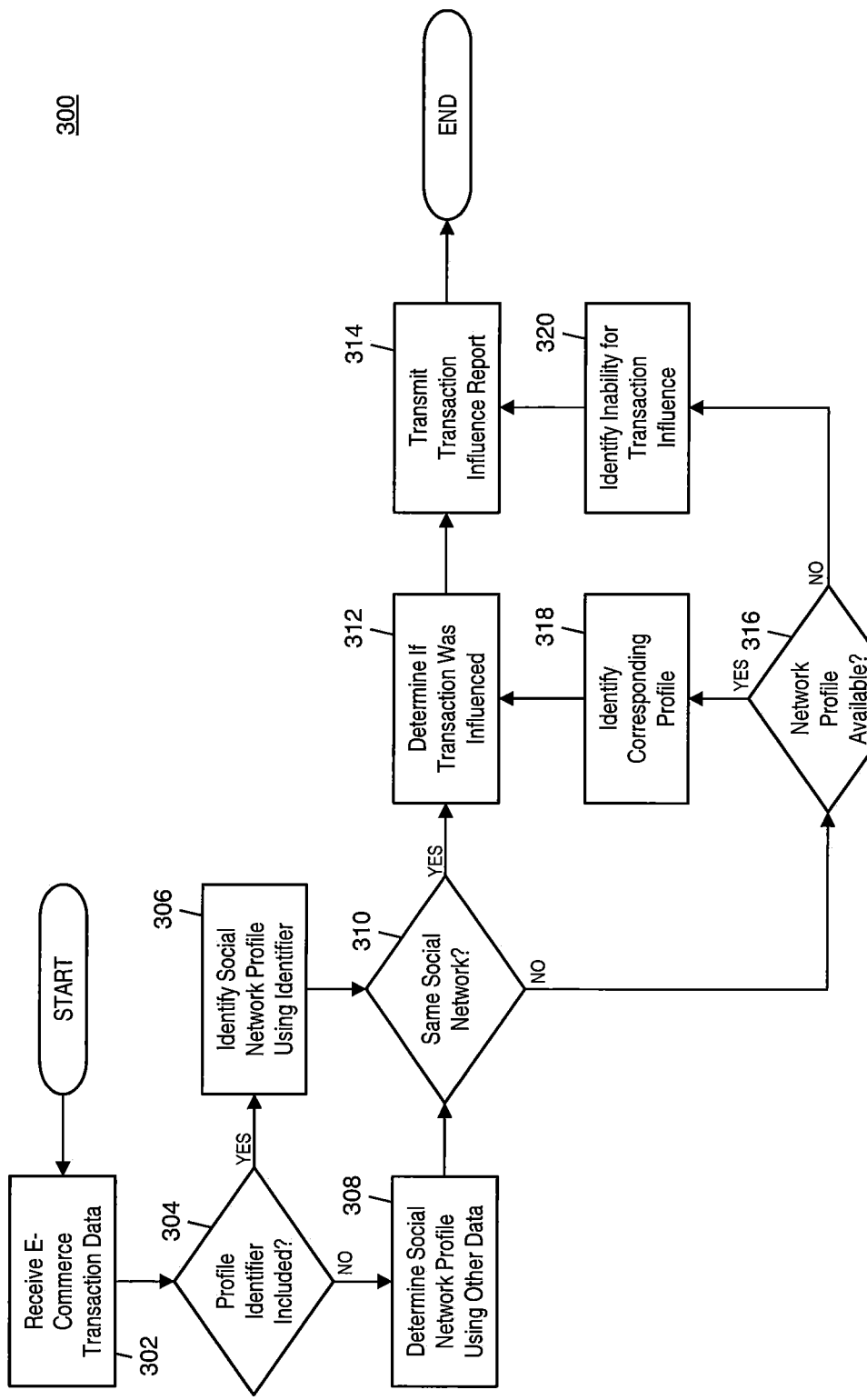
FIG. 3 is a flow diagram illustrating a process for reporting social network influencer marketing effectiveness based on transaction data using the processing server of FIG. 2 in accordance with exemplary embodiments.

FIG. 3 illustrates a process 300 for the determination of the effectiveness of a promoted post from an influencer 106 of a social network 108 by the processing server 102 based on social network connections and transaction data for related electronic commerce transactions.

In step 302, the receiving device 202 of the processing server 102 may receive electronic commerce ("e-commerce") transaction data from a requesting entity 104 or other suitable entity, such as may be included in an effectiveness request. The e-commerce transaction data may include sets of transaction data for each of a plurality of different e-commerce transactions, which may be associated with a purchase that is an intended target for a promoted post on a social network 108. In step 304, the processing server 102 may determine if a profile identifier is included in the transaction data. For instance, purchases made through a social network 108 may include a profile identifier in the related transaction data.

If, in step 304, it is determined that the profile identifier is included in a set of transaction data, then, in step 306, the querying module 210 of the processing server 102 may execute a query on the social network database 206 of the processing server 102 to identify a related social network profile 208 that includes the profile identifier. If, in step 304, it is determined that the profile identifier is not included, then, in step 308, the querying module 210 may execute a query to identify a related social network profile 208 based on a correspondence between the included one or more data values and the set of transaction data for the related e-commerce transaction. After social network profiles 208 have been identified for each e-commerce transaction, if possible, then, in step 310, the processing server 102 may determine, for each social network profile 208, if it is related to the same social network 108 used for the promoted post. The determination may be based on the network identifier included in the respective social network profile 208 as compared to the network identifier for the social network 108 used for the promoted post.

If the social network profile 208 is related to a user profile on the same social network, then, in step 312, the determination module 212 of the processing server 102 may determine if the related e-commerce transaction was influenced by the promoted post. Such a determination may be based on at least the social network connections included in the corresponding social network profile 208 and a social network profile 208 related to the promoted post, as well as a time of the e-commerce transaction and the time at which the promoted post was posted and/or promoted. In step 314, the generation module 214 may generate a report indicating the influence of the promoted post on the e-commerce transaction, based on the determination, which may be electronically transmitted by the transmitted device 216 of the processing server 102 to the requesting entity 104.

If, in step 310, it was determined that a social network profile 208 related to an e-commerce transaction is for a user profile on a different social network 108, then, in step 316, the processing server 102 may determine if there is a related social network profile 208 available for the social network 108 used for the promoted post. If such a social network profile 208 is available, then, in step 318, the querying module 210 of the processing server 102 may execute a query on the social network database 206 to attempt to identify the related social network profile 208 that is for the same social network user 110 on the social network 108 on which the promoted post was made. The related social network profile 208 may be identified, for example, based on inclusion of its profile identifier in the social network profile 208 of the different social network 108. Then, the process 300 may proceed to step 312 to determine if the e-commerce transaction was influenced based on the related social network profile 208.

If, in step 316, the processing server 102 determines that there is no related social network profile 208 that can be identified, then the process 300 may proceed to step 320, where the determination module 212 may determine that there is an inability to determine if the e-commerce transaction was influenced by the promoted post. Then, in step 314, the determination may be included in the report generated by the generation module 214 and electronically transmitted to the requesting entity 104.

Figure 4:
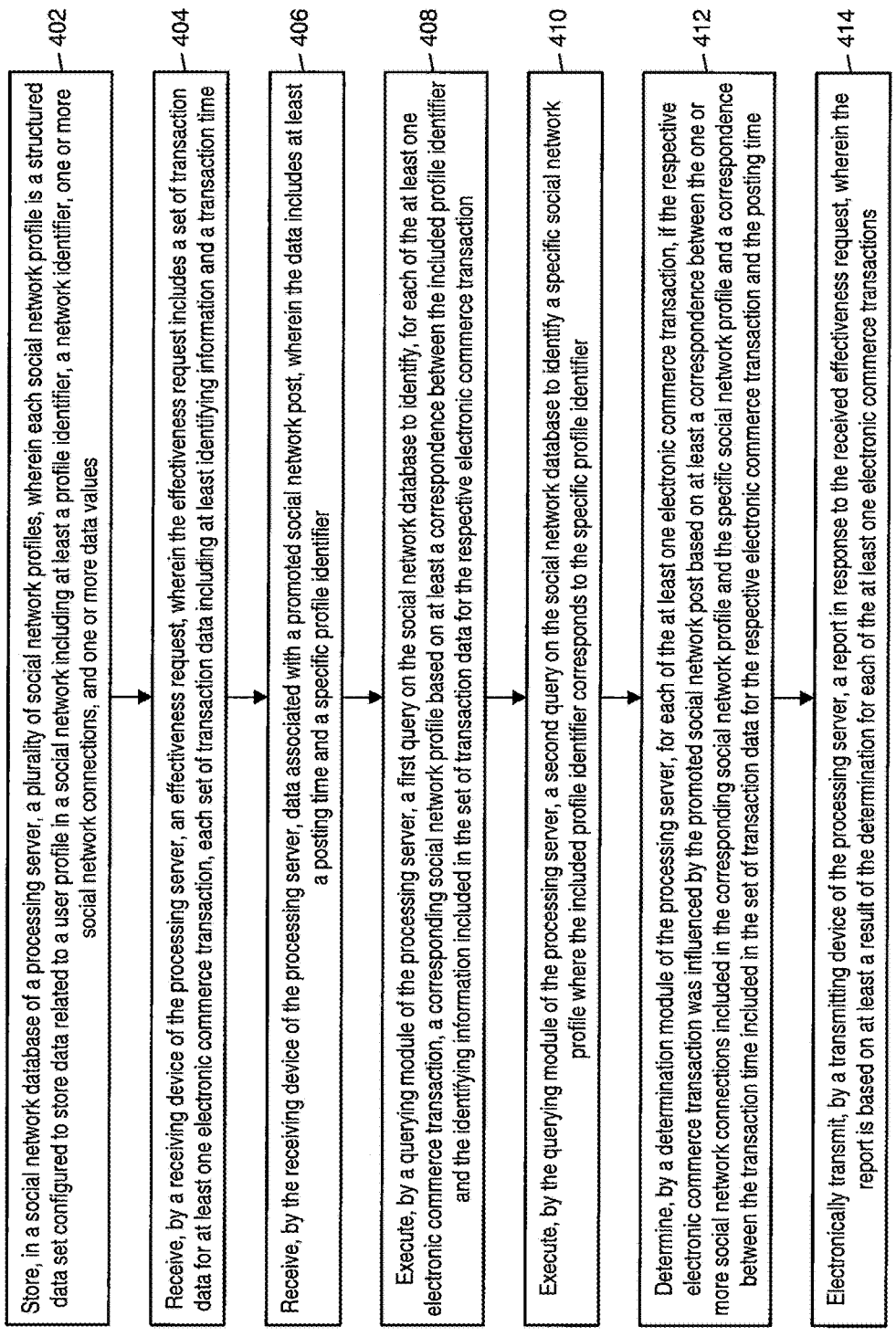
FIG. 4 is a flow chart illustrating an exemplary method for identification of influencer social network marketing effectiveness in accordance with exemplary embodiments.

Exemplary Method for Identification of Influencer Social Network Marketing Effectiveness FIG. 4 illustrates a method 400 for the identification of the effectiveness of an influencer performing social network marketing via a promoted post that is based on electronic commerce transaction data.

In step 402, a plurality of social network profiles (e.g., the social network profiles 208) may be stored in a social network database (e.g., the social network database 206) of a processing server (e.g., the processing server 102), wherein each social network profile is a structured data set configured to store data related to a user profile in a social network including at least a profile identifier, a network identifier, one or more social network connections, and one or more data values. In step 404, an effectiveness request may be received by a receiving device (e.g., the receiving device 202) of the processing server, wherein the effectiveness request includes a set of transaction data for at least one electronic commerce transaction, each set of transaction data including at least identifying information and a transaction time.

In step 406, data associated with a promoted social network post may be received by the receiving device of the processing server, wherein the data includes at least a posting time and a specific profile identifier. In step 408, a first query may be executed by a querying module (e.g., the querying module 210) of the processing server on the social network database to identify, for each of the at least one electronic commerce transaction, a corresponding social network profile based on at least a correspondence between the included profile identifier and the identifying information included in the set of transaction data for the respective electronic commerce transaction. In step 410, a second query may be executed on the social network database by the querying module of the processing server to identify a specific social network profile where the included profile identifier corresponds to the specific profile identifier.

In step 412, a determination module (e.g., the determination module 212) of the processing server may determine, for each of the at least one electronic commerce transaction, if the respective electronic commerce transaction was influenced by the promoted social network post based on at least a correspondence between the one or more social network connections included in the corresponding social network profile and the specific social network profile and a correspondence between the transaction time included in the set of transaction data for the respective electronic commerce transaction and the posting time. In step 414, a report may be electronically transmitted by a transmitting device (e.g., the transmitting device 216) of the processing server in response to the received effectiveness request, wherein the report is based on at least a result of the determination for each of the at least one electronic commerce transactions.

In one embodiment, the report may include at least the profile identifier included in the corresponding social network profile for each of the at least one commerce transactions. In some embodiments, the network identifier included in each corresponding social network profile may correspond to the network identifier included in the specific social network profile. In one embodiment, the identifying information may include at least one of: name, city, email address, identification number, username, telephone number, shipping address, zip code, postal code, country, gender, and age.

In some embodiments, the method 400 may further include executing, by the querying module of the processing server, a third query on the social network database to identify, for each corresponding social network profile that includes a network identifier that does not correspond to the network identifier included in the specific social network profile, a related social network profile based on at least a correspondence between the one or more data values included in the corresponding social network profile and one of: the one or more data values and the profile identifier included in the related social network profile, wherein the network identifier included in the related social network profile corresponds to the network identifier included in the specific social network profile. In a further embodiment, the report may include at least the profile identifier included in each of the corresponding social network profiles. In another further embodiment, the report may include at least the profile identifier included in each of the corresponding social network profiles and related social network profiles where the included network identifier corresponds to the network identifier included in the specific social network profile.

In one embodiment, the one or more data values may include at least one of: name, age, and geographic location. In a further embodiment, the method 400 may also include determining, by the determination module of the processing server, one or more demographic metrics based on at least the one or more data values included in each corresponding social network profile where the result of determination for the corresponding electronic commerce transaction is a positive result, wherein the report includes at least the determined one or more demographic metrics. In some embodiments, the report may further include a conversion percentage based on a ratio of determinations having a positive result for each of the at least one electronic commerce transactions to determinations having a negative result for each of the at least one electronic commerce transactions.

Computer System Architecture

Figure 5:
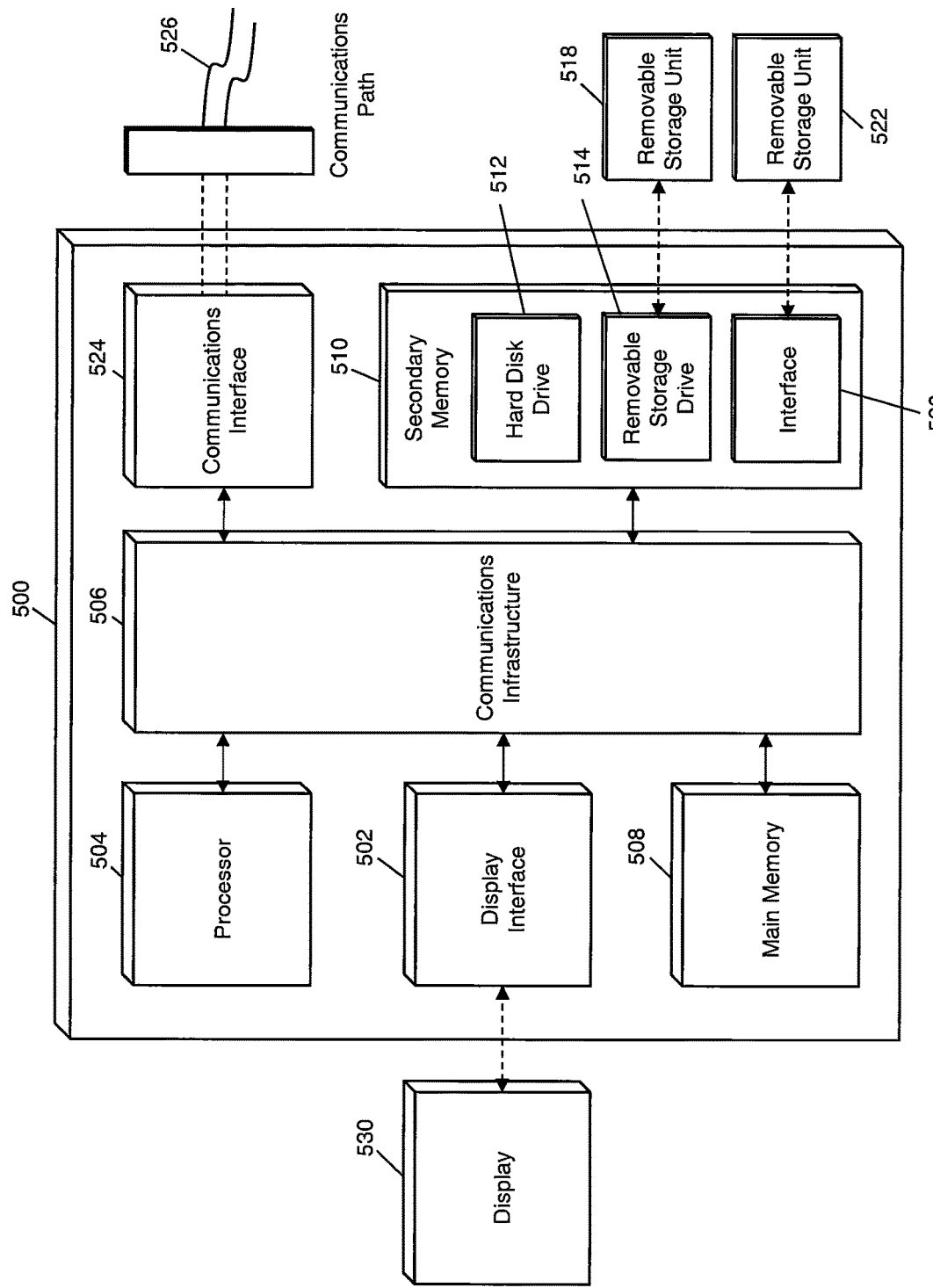
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for identifying influencer social network marketing effectiveness. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for identification of influencer social network marketing effectiveness, comprising:
   storing, in a social network database of a processing server, a plurality of social network profiles, wherein each social network profile is a structured data set configured to store data related to a user profile in a social network including at least a profile identifier, a network identifier, one or more social network connections, and one or more data values;
   receiving, by a receiving device of the processing server, an effectiveness request, wherein the effectiveness request includes a set of transaction data for at least one electronic commerce transaction, each set of transaction data including at least identifying information and a transaction time;
   receiving, by the receiving device of the processing server, data associated with a promoted social network post, wherein the data includes at least a posting time and a specific profile identifier;
   executing, by a querying module of the processing server, a first query on the social network database to identify, for each of the at least one electronic commerce transaction, a corresponding social network profile based on at least a correspondence between the included profile identifier and the identifying information included in the set of transaction data for the respective electronic commerce transaction;
   executing, by the querying module of the processing server, a second query on the social network database to identify a specific social network profile where the included profile identifier corresponds to the specific profile identifier;
   executing, by the querying module of the processing server, a third query on the social network database to identify, for each corresponding social network profile that includes a network identifier that does not correspond to the network identifier included in the specific social network profile, a related social network profile based on at least a correspondence between the one or more data values included in the corresponding social network profile and one of: the one or more data values and the profile identifier included in the related social network profile, wherein the network identifier included in the related social network profile corresponds to the network identifier included in the specific social network profile;
   determining, by a determination module of the processing server, for each of the at least one electronic commerce transaction, if the respective electronic commerce transaction was influenced by the promoted social network post based on at least a correspondence between the one or more social network connections included in the corresponding social network profile or related social network profile and the specific social network profile and a correspondence between the transaction time included in the set of transaction data for the respective electronic commerce transaction and the posting time; and
   electronically transmitting, by a transmitting device of the processing server, a report in response to the received effectiveness request, wherein the report is based on at least a result of the determination for each of the at least one electronic commerce transactions.

2. The method of claim 1, wherein the report includes at least the profile identifier included in the corresponding social network profile for each of the at least one commerce transactions.

3. The method of claim 1, wherein the network identifier included in each corresponding social network profile corresponds to the network identifier included in the specific social network profile.

4. The method of claim 1, wherein the report includes at least the profile identifier included in each of the corresponding social network profiles.

5. The method of claim 1, wherein the report includes at least the profile identifier included in each of the corresponding social network profiles and related social network profiles where the included network identifier corresponds to the network identifier included in the specific social network profile.

6. The method of claim 1, wherein the identifying information includes at least one of: name, city, email address, identification number, username, telephone number, shipping address, zip code, postal code, country, gender, and age.

7. The method of claim 1, wherein the one or more data values includes at least one of: name, age, and geographic location.

8. The method of claim 7, further comprising:
   determining, by the determination module of the processing server, one or more demographic metrics based on at least the one or more data values included in each corresponding social network profile where the result of determination for the corresponding electronic commerce transaction is a positive result, wherein
   the report includes at least the determined one or more demographic metrics.

9. The method of claim 1, wherein the report further includes a conversion percentage based on a ratio of determinations having a positive result for each of the at least one electronic commerce transactions to determinations having a negative result for each of the at least one electronic commerce transactions.

10. A system for identification of influencer social network marketing effectiveness, comprising:
    a social network database of a processing server configured to store a plurality of social network profiles, wherein each social network profile is a structured data set configured to store data related to a user profile in a social network including at least a profile identifier, a network identifier, one or more social network connections, and one or more data values;
    a receiving device of the processing server configured to receive
       an effectiveness request, wherein the effectiveness request includes a set of transaction data for at least one electronic commerce transaction, each set of transaction data including at least identifying information and a transaction time, and
       data associated with a promoted social network post, wherein the data includes at least a posting time and a specific profile identifier;
    a querying module of the processing server configured to execute
       a first query on the social network database to identify, for each of the at least one electronic commerce transaction, a corresponding social network profile based on at least a correspondence between the included profile identifier and the identifying information included in the set of transaction data for the respective electronic commerce transaction,
- a second query on the social network database to identify a specific social network profile where the included profile identifier corresponds to the specific profile identifier, and
- a third query on the social network database to identify, for each corresponding social network profile that includes a network identifier that does not correspond to the network identifier included in the specific social network profile, a related social network profile based on at least a correspondence between the one or more data values included in the corresponding social network profile and one of: the one or more data values and the profile identifier included in the related social network profile, wherein the network identifier included in the related social network profile corresponds to the network identifier included in the specific social network profile;
- a determination module of the processing server configured to determine for each of the at least one electronic commerce transaction, if the respective electronic commerce transaction was influenced by the promoted social network post based on at least a correspondence between the one or more social network connections included in the corresponding social network profile or related social network profile and the specific social network profile and a correspondence between the transaction time included in the set of transaction data for the respective electronic commerce transaction and the posting time; and
- a transmitting device of the processing server configured to electronically transmit a report in response to the received effectiveness request, wherein the report is based on at least a result of the determination for each of the at least one electronic commerce transactions.

11. The system of claim 10, wherein the report includes at least the profile identifier included in the corresponding social network profile for each of the at least one commerce transactions.

12. The system of claim 10, wherein the network identifier included in each corresponding social network profile corresponds to the network identifier included in the specific social network profile.

13. The system of claim 10, wherein the report includes at least the profile identifier included in each of the corresponding social network profiles.

14. The system of claim 10, wherein the report includes at least the profile identifier included in each of the corresponding social network profiles and related social network profiles where the included network identifier corresponds to the network identifier included in the specific social network profile.

15. The system of claim 10, wherein the identifying information includes at least one of: name, city, email address, identification number, username, telephone number, shipping address, zip code, postal code, country, gender, and age.

16. The system of claim 10, wherein the one or more data values includes at least one of: name, age, and geographic location.

17. The system of claim 16, wherein
- the determination module of the processing server is further configured to determine one or more demographic metrics based on at least the one or more data values included in each corresponding social network profile where the result of determination for the corresponding electronic commerce transaction is a positive result, and
- the report includes at least the determined one or more demographic metrics.

18. The system of claim 10, wherein the report further includes a conversion percentage based on a ratio of determinations having a positive result for each of the at least one electronic commerce transactions to determinations having a negative result for each of the at least one electronic commerce transactions.

* * * * *